United States Patent
Kusaka et al.

(10) Patent No.: US 11,420,332 B2
(45) Date of Patent: Aug. 23, 2022

(54) METHOD OF ADJUSTING POSTURE OF 6-AXIS ROBOT

(71) Applicant: Nidec Corporation, Kyoto (JP)

(72) Inventors: Takeshi Kusaka, Kyoto (JP); Thanh Nhat Doan, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 695 days.

(21) Appl. No.: 16/360,252

(22) Filed: Mar. 21, 2019

(65) Prior Publication Data

US 2019/0299417 A1    Oct. 3, 2019

(30) Foreign Application Priority Data

Mar. 30, 2018  (JP) .............................. JP2018-068175

(51) Int. Cl.
*B25J 9/16* (2006.01)
*B25J 9/06* (2006.01)
*B25J 17/02* (2006.01)

(52) U.S. Cl.
CPC .............. *B25J 9/1692* (2013.01); *B25J 9/06* (2013.01); *B25J 17/0241* (2013.01)

(58) Field of Classification Search
CPC ........ B25J 9/1692; B25J 9/06; B25J 17/0241; B25J 9/046; B25J 9/023; B25J 9/1602; B25J 9/1612; B25J 9/1664; B25J 17/02; B25J 19/022; G05B 2219/39018; G05B 2219/39478
USPC ................................................ 700/245, 254
See application file for complete search history.

(56) References Cited

U.S. PATENT DOCUMENTS

| | | | | |
|---|---|---|---|---|
| 5,162,713 A | * | 11/1992 | Mohri | ................... B25J 9/1692 318/568.19 |
| 9,089,881 B2 | * | 7/2015 | Wang | ....................... B08B 1/04 |
| 9,302,388 B2 | * | 4/2016 | Gomi | .................... B25J 9/1651 |
| 9,682,755 B2 | * | 6/2017 | Dufour | ............... G05D 1/0692 |
| 10,099,364 B2 | * | 10/2018 | Miyasaka | ............... B25J 9/047 |

(Continued)

FOREIGN PATENT DOCUMENTS

| DE | 102011052386 A1 * | 2/2012 | ............ B25J 9/1692 |
|---|---|---|---|
| JP | 2009-274186 A | 11/2009 | |
| WO | WO-2021075876 A2 * | 4/2021 | |

OTHER PUBLICATIONS

DE102011052386A1.translate (Year: 2012).*

*Primary Examiner* — B M M Hannan
(74) *Attorney, Agent, or Firm* — Keating & Bennett (57) ABSTRACT

A method of adjusting a posture of a 6-axis robot standing in a direction perpendicular or substantially perpendicular to a robot mounting surface includes specifying axis central positions of three axes located at different heights in the direction perpendicular or substantially perpendicular to the robot mounting surface of the 6-axis robot, specifying two planes including two arcs of which rotation centers are represented by two axes farther away from the robot mounting surface among the three axes, specifying a position of a predetermined point on the arc farther away from the robot mounting surface among the two arcs, and determining an angle adjustment amount of the three axes in a rotation direction and an angle adjustment amount of an axis extending between the two axes in a rotation direction based on the specified axis central positions of the three axes, the specified two planes, and the specified position of the predetermined point.

12 Claims, 5 Drawing Sheets

(56) References Cited

U.S. PATENT DOCUMENTS

| | | | |
|---|---|---|---|
| 2007/0145027 A1* | 6/2007 | Izawa | B25J 9/1694 |
| | | | 219/124.34 |
| 2012/0239194 A1* | 9/2012 | Kagawa | B25J 9/1692 |
| | | | 700/254 |
| 2013/0041509 A1* | 2/2013 | Saito | B25J 9/047 |
| | | | 700/261 |
| 2016/0008905 A1* | 1/2016 | Izawa | B23K 9/287 |
| | | | 219/130.1 |
| 2016/0288335 A1* | 10/2016 | Akaha | B25J 9/046 |
| 2017/0291297 A1* | 10/2017 | Miyasaka | B25J 9/047 |
| 2018/0024521 A1* | 1/2018 | Matsuura | B25J 9/1692 |
| | | | 700/83 |
| 2018/0200893 A1* | 7/2018 | Taguchi | B25J 13/085 |
| 2018/0221904 A1* | 8/2018 | Yoshino | B25J 9/046 |
| 2018/0243928 A1* | 8/2018 | Haddadin | B25J 17/0291 |
| 2019/0168381 A1* | 6/2019 | Tscharnuter | B25J 9/1015 |
| 2020/0101607 A1* | 4/2020 | Matsushima | B23K 26/0884 |

\* cited by examiner

METHOD OF ADJUSTING POSTURE OF 6-AXIS ROBOT

CROSS REFERENCE TO RELATED APPLICATIONS

This application claims the benefit of priority to Japanese Patent Application No. 2018-068175 filed on Mar. 30, 2018. The entire contents of this application are hereby incorporated herein by reference.

BACKGROUND OF THE INVENTION

1. Field of the Invention

The present disclosure relates to a method of adjusting a posture of a 6-axis robot.

2. Description of the Related Art

A 6-axis robot is known as an articulated robot. Calibration of an origin position of each axis of a 6-axis robot is performed after the 6-axis robot is assembled by an operator.

The 6-axis robot has first to sixth axes sequentially in order from a robot mounting surface and is configured so that a rotation axis of the first axis is orthogonal to the robot mounting surface, a rotation axis of the second axis is orthogonal to the rotation axis of the first axis, the rotation axis of the second axis, a rotation axis of the third axis, and a rotation axis of the fifth axis are in parallel, the rotation axis of the fifth axis is orthogonal to the rotation axis of the fourth axis and a rotation axis of the sixth axis at the same point, and there is a measurement point on a plane which is orthogonal to the rotation axis of the second axis as well as the rotation axis of the first axis. According to the conventional technique, a process of rotating the fourth axis by 180°, a process of rotating the fifth axis by twice a predetermined angle, a process of deriving an error angle by further rotating the fifth axis, and a process of adding the predetermined angle to the error angle to calibrate an origin position of the fifth axis are sequentially performed, and thus the origin position of the fifth axis of the 6-axis robot is calibrated.

In the conventional technique, it is necessary to measure an angle formed by the rotation axis of the fourth axis and the rotation axis of the sixth axis in order to obtain the predetermined angle. In order to derive the error angle, it is necessary to first derive a line connecting coordinates of the measurement point in a measurement posture and coordinates of the measurement point after the fifth axis is rotated by twice the predetermined angle. It is also necessary to rotate the fifth axis so as to pass through central coordinates of the derived line and to overlap the coordinates of the measurement point on a straight line orthogonal to the above line. Therefore, it is difficult to perform calibration in a short time because work for calibrating the origin position of the fifth axis is complicated. Further, work for calibrating a posture of an entirety of the robot is further complicated and thus it is difficult to perform calibration in a short time.

SUMMARY OF THE INVENTION

A method of adjusting a posture of a 6-axis robot, which is an example embodiment of the present disclosure, is a method of adjusting a posture of a 6-axis robot standing in a direction perpendicular or substantially perpendicular to a robot mounting surface. The method includes specifying axis central positions of three axes located at different heights in the direction perpendicular or substantially perpendicular to the robot mounting surface of the 6-axis robot, specifying two planes including two arcs of which rotation centers are represented by two axes farther away from the robot mounting surface among the three axes, specifying a position of a predetermined point on the arc farther away from the robot mounting surface among the two arcs, and determining an angle adjustment amount of the three axes in a rotation direction and an angle adjustment amount of an axis extending between the two axes in a rotation direction based on the specified axis central positions of the three axes, the specified two planes, and the specified position of the predetermined point.

The above and other elements, features, steps, characteristics and advantages of the present disclosure will become more apparent from the following detailed description of the example embodiments with reference to the attached drawings.

DETAILED DESCRIPTION OF THE PREFERRED EMBODIMENTS

Hereinafter, example embodiments for carrying out the present disclosure will be described in detail with reference to the accompanying drawings. The embodiments to be described below are examples as a realization means of the present disclosure and should be appropriately modified or changed according to a configuration and various conditions of an apparatus and system to which the present disclosure is applied. The present disclosure is not limited to the following embodiments.

Figure 1:
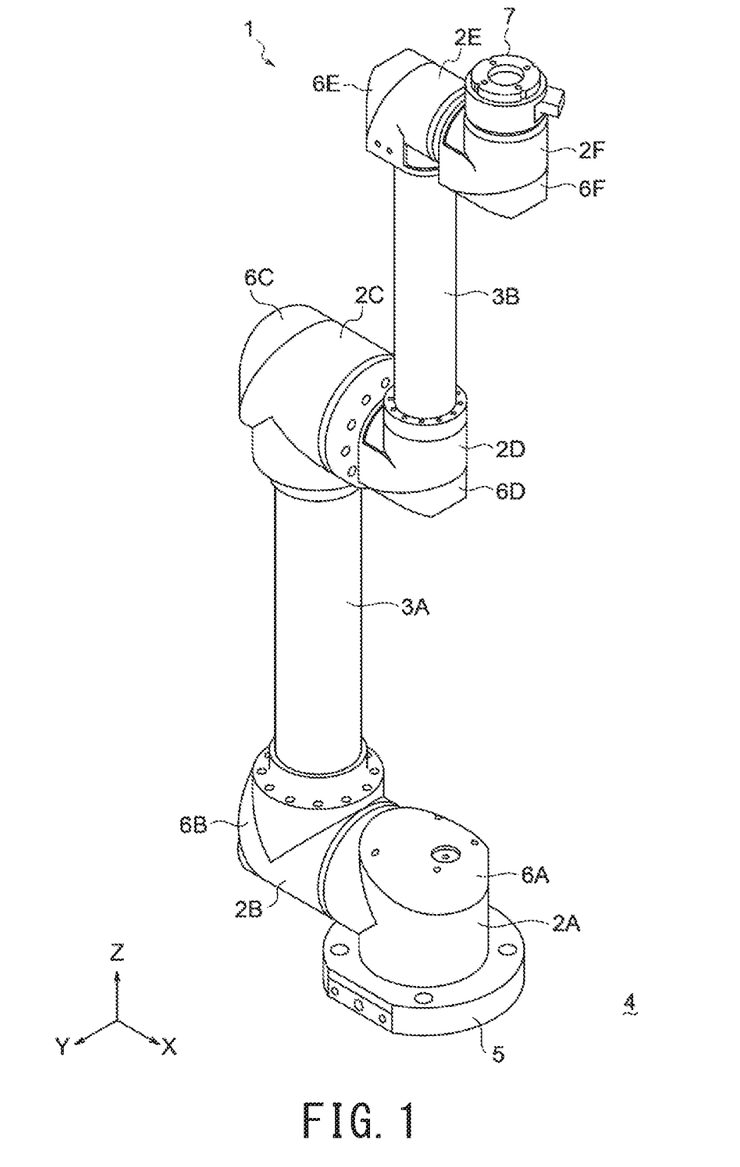
FIG. 1 is perspective view of a 6-axis robot according to an example embodiment of the present disclosure.
Figure 2:
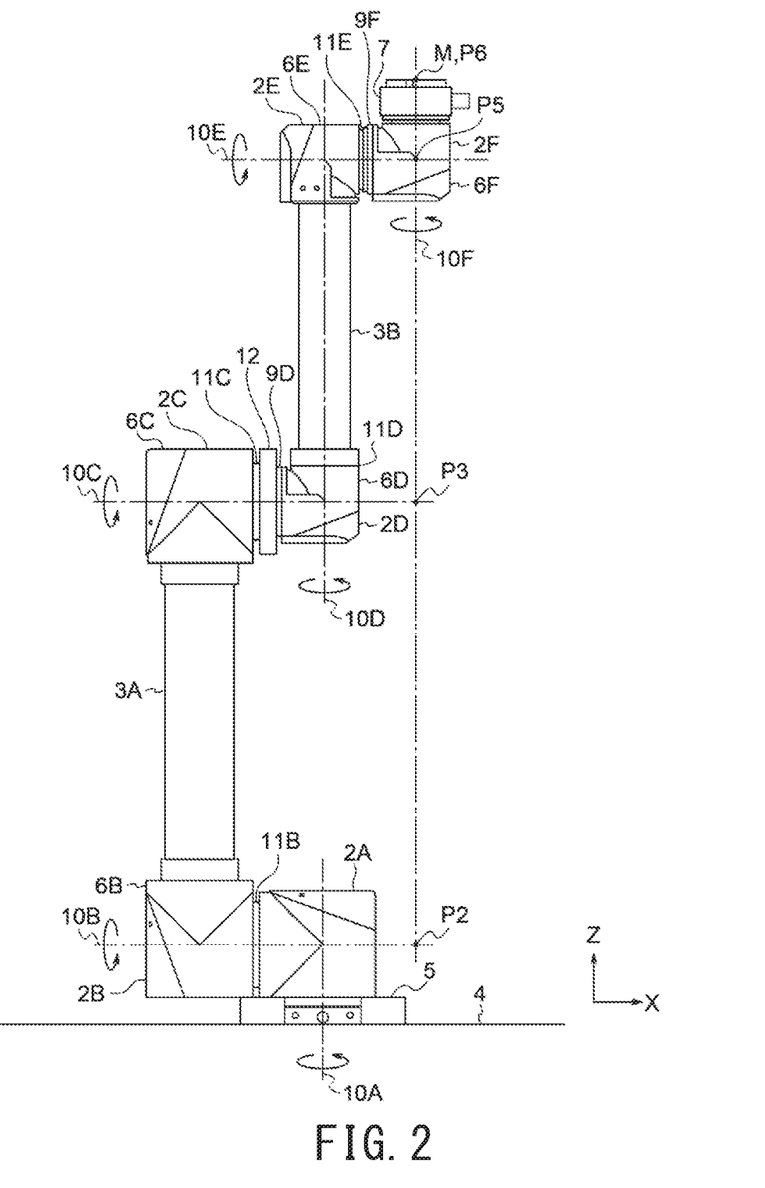
FIG. 2 is a left side view of a 6-axis robot according to an example embodiment of the present disclosure.

FIG. 1 is a perspective view of a robot 1 according to an embodiment of the present disclosure. For convenience of description, an upward direction in FIG. 1 is referred to as a Z direction, a left direction is referred to as a Y direction and a forward direction is referred to as an X direction. The Z direction is a height direction of the robot 1. Further, a direction opposite to the Z direction is referred to as a downward direction, and the same direction as the Z direction is referred to as an upward direction. FIG. 2 is a left side view of the robot 1 shown in FIG. 1.

The robot 1 of the present embodiment is a 6-axis robot that can be used for assembling or manufacturing predetermined products and is installed and used, for example, on an assembly line or a production line. As shown in FIGS. 1 and 2, the robot 1 includes six rotational joints 2A to 2F and two arms 3A and 3B. In the following description, the six rotational joints 2A to 2F are referred to as a first rotational joint 2A, a second rotational joint 2B, a third rotational joint 2C, a fourth rotational joint 2D, a fifth rotational joint 2E, and a sixth rotational joint 2F in order from a robot mounting surface 4. The two arms 3A and 3B are referred to as a first arm 3A and a second arm 3B in order from the robot mounting surface 4. FIG. 1 shows a state in which the robot 1 stands up in a direction substantially perpendicular to the robot mounting surface 4.

The robot 1 includes a support member 5 constituting a base end portion of the robot 1. The support member 5 is fixed to the mounting surface 4. The first rotational joint 2A is relatively rotatably connected to the support member 5.

The first arm 3A and the second arm 3B are formed to have a thinly elongated cylindrical shape. An outer diameter of the second arm 3B is smaller than an outer diameter of the first arm 3A. Further, a length of the second arm 3B is smaller than a length of the first arm 3A.

The first rotational joint 2A and the second rotational joint 2B are relatively rotatably connected, and the second rotational joint 2B and a base end (a lower end) of the first arm 3A are fixed. A front end of the first arm 3A and the third rotational joint 2C are fixed, and the third rotational joint 2C and the fourth rotational joint 2D are relatively rotatably connected. The fourth rotational joint 2D and a lower end of the second arm 3B are relatively rotatably connected, and a front end of the second arm 3B and the fifth rotational joint 2E are fixed. The fifth rotational joint 2E and the sixth rotational joint 2F are relatively rotatably connected. An attaching portion 7 to which an end effector or the like (not shown) can be relatively rotatably attached is formed in the sixth rotational joint 2F.

Further, in the present embodiment, the first rotational joint 2A, the second rotational joint 2B, and the third rotational joint 2C have substantially the same structure, and the fourth rotational joint 2D, the fifth rotational joint 2E, and the sixth rotational joint 2F have substantially the same structure. Therefore, as shown in FIGS. 1 and 2, the first rotational joint 2A, the second rotational joint 2B, and the third rotational joint 2C are formed to have substantially the same size, and the fourth rotational joint 2D, the fifth rotational joint 2E, and the sixth rotational joint 2F are formed to have substantially the same size. Further, the fourth rotational joint 2D, the fifth rotational joint 2E, and the sixth rotational joint 2F are smaller than the first rotational joint 2A, the second rotational joint 2B, and the third rotational joint 2C.

However, the first rotational joint 2A, the second rotational joint 2B, and the third rotational joint 2C have the same configuration as the fourth rotational joint 2D, the fifth rotational joint 2E, and the sixth rotational joint 2F except for different sizes thereof.

Each of the first rotational joint 2A to the sixth rotational joint 2F includes a motor (not shown), a decelerator (not shown) connected to the motor, a position detecting mechanism (not shown) for detecting a rotational position of the motor, a circuit board (not shown) on which the motor and the position detecting mechanism are electrically connected, and case bodies 6A to 6F in which the motor, the decelerator, the position detecting mechanism, and the circuit board are accommodated. Each motor is connected to a controller (not shown) for controlling the motor in a wired or wireless manner.

An output side member (not shown) of the first rotational joint 2A is fixed to the support member 5 so that the support member 5 and the first rotational joint 2A are connected. The support member 5 and the first rotational joint 2A are connected such that a central axis 10A of the first rotational joint 2A and a central axis of the support member 5 coincide with each other.

The first rotational joint 2A and the second rotational joint 2B are connected such that the central axis 10A of the first rotational joint 2A is orthogonal to a central axis 10B of the second rotational joint 2B. Further, the case body 6A of the first rotational joint 2A is directly fixed to a flange portion 11B of the second rotational joint 2B.

As described above, the first rotational joint 2A is directly fixed to the flange portion 11B of the second rotational joint 2B such that the central axis 10A of the first rotational joint 2A is orthogonal to the central axis 10B of the second rotational joint 2B. Further, the first rotational joint 2A and the second rotational joint 2B may be rotated with the central axis 10A of the first rotational joint 2A as a rotation axis with respect to the support member 5.

The second rotational joint 2B and the first arm 3A are connected such that the central axis 10B of the second rotational joint 2B is orthogonal to a central axis in a longitudinal direction of the first arm 3A. Further, the lower end of the first arm 3A is fixed to the case body 6B of the second rotational joint 2B.

The first arm 3A and the third rotational joint 2C are connected such that the central axis in a longitudinal direction of the first arm 3A is orthogonal to a central axis 10C of the third rotational joint 2C. Further, the front end of the first arm 3A is fixed to the case body 6C of the third rotational joint 2C. The central axis 10C is parallel to the central axis 10B.

The third rotational joint 2C and the fourth rotational joint 2D are connected such that the central axis 10C of the third rotational joint 2C is orthogonal to a central axis 10D of the fourth rotational joint 2D. Further, an attachment surface 9D of the case body 6D of the fourth rotational joint 2D and a flange portion 11C of the third rotational joint 2C are fixed to the central axis 10C of the third rotational joint 2C using a connecting member 12 having a predetermined thickness (length). The central axis 10D and the central axis 10A are coaxial.

The fourth rotational joint 2D and the second arm 3B are connected such that the central axis 10D of the fourth rotational joint 2D and a central axis in a longitudinal direction of the second arm 3B coincide with each other. Further, the lower end of the second arm 3B is fixed to a flange portion 11D of the fourth rotational joint 2D.

Therefore, the second arm 3B may be rotated with the central axis 10C of the third rotational joint 2C as a rotation axis with respect to the first arm 3A.

The second arm 3B and the fifth rotational joint 2E are connected such that the central axis in a longitudinal direction of the second arm 3B is orthogonal to a central axis 10E of the fifth rotational joint 2E. Further, the front end of the second arm 3B is fixed to the case body 6E of the fifth rotational joint 2E. The central axis 10E is parallel to the central axis 10B and the central axis 10C.

The fifth rotational joint 2E and the sixth rotational joint 2F are connected such that the central axis 10E of the fifth rotational joint 2E is orthogonal to a central axis 10F of the sixth rotational joint 2F. Further, an attachment surface 9F of the case body 6F of the sixth rotational joint 2F is directly fixed to a flange portion 11E of the fifth rotational joint 2E.

Therefore, the second arm 3B, which is relatively rotatable with the central axis 10C of the third rotational joint 2C as a rotation axis with respect to the first arm 3A, may be rotated on a plane including the central axis 10A of the first rotational joint 2A. Further, the second arm 3B is formed shorter than the first arm 3A such that the first rotational joint 2A and the fifth rotational joint 2E do not interfere with each other when the second arm 3B rotates about the central axis 10C.

Figure 4:
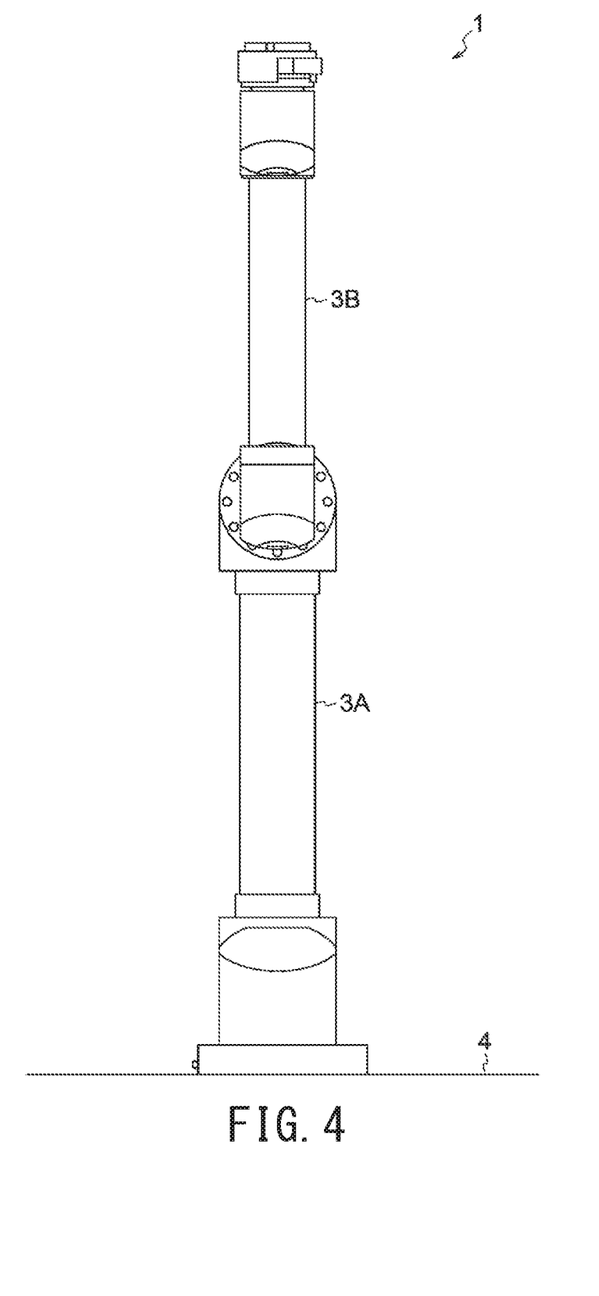
FIG. 4 is a front view of a 6-axis robot according to an example embodiment of the present disclosure after the initial error is adjusted.

A robot is assembled by an operator and set to an initial posture (ideally, for example, an upright posture shown in FIG. 4). Then, so-called calibration is performed from a state of the initial posture. In this specification, correction (adjustment) of an initial posture is referred to as initial error correction, and correction performed after the initial posture is set is referred to as calibration.

Generally, an initial posture immediately after a robot is assembled includes some errors (initial errors). In particular, since a rotational joint of the robot is easy to rotate, there is a case (angular error) in which an angle around a central axis of the rotational joint is different from a design value in the initial posture of the robot. Further, the initial posture of the robot may be adjusted by visual inspection of the operator or by a jig after assembly. However, even after the initial posture of the robot is adjusted, the initial posture of the robot may have an error (initial error).

Figure 3:
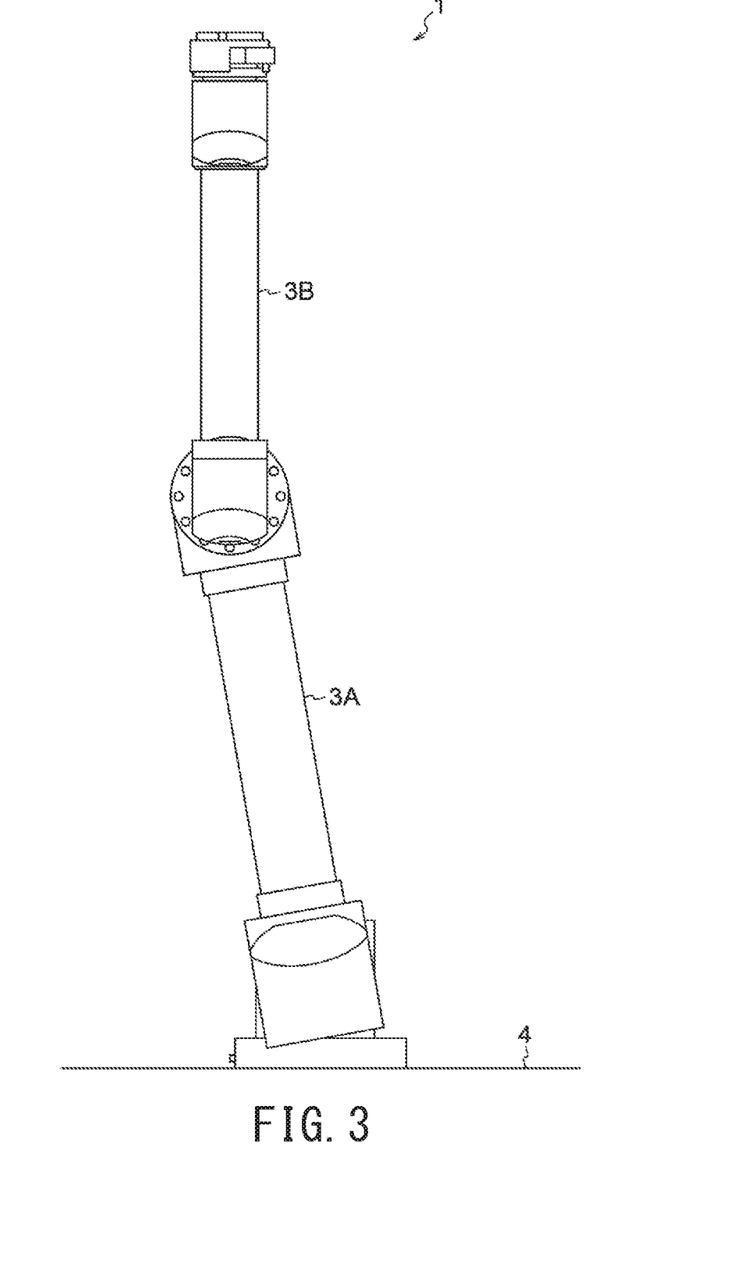
FIG. 3 is a front view of a 6-axis robot according to an example embodiment of the present disclosure before an initial error is adjusted.

After the initial posture of the robot is set, calibration is performed on the robot. However, since the calibration uses convergence calculation, the calculation may diverge when the initial error is large. The calculation may be very sensitive to the initial error depending on an algorithm used in the calibration. Further, when the initial error is large, it may take a long time to perform the calculation of the calibration. FIG. 3 is a front view of the robot 1 including an initial error.

In the present embodiment, a method of eliminating or reducing an initial error will be described. When the initial error is reduced, calibration calculation performed thereafter proceeds smoothly. That is, it is possible to shorten a calculation time of the calibration. Further, in order to facilitate understanding of the initial error, the initial error of FIG. 3 is exaggerated.

In the present embodiment, when there is an initial error in an initial posture of the robot as shown in FIG. 3, the initial posture of the robot is adjusted to an initial posture shown in FIG. 4. Hereinafter, a method of adjusting an initial posture of a robot will be described with reference to FIG. 5.

Figure 5:
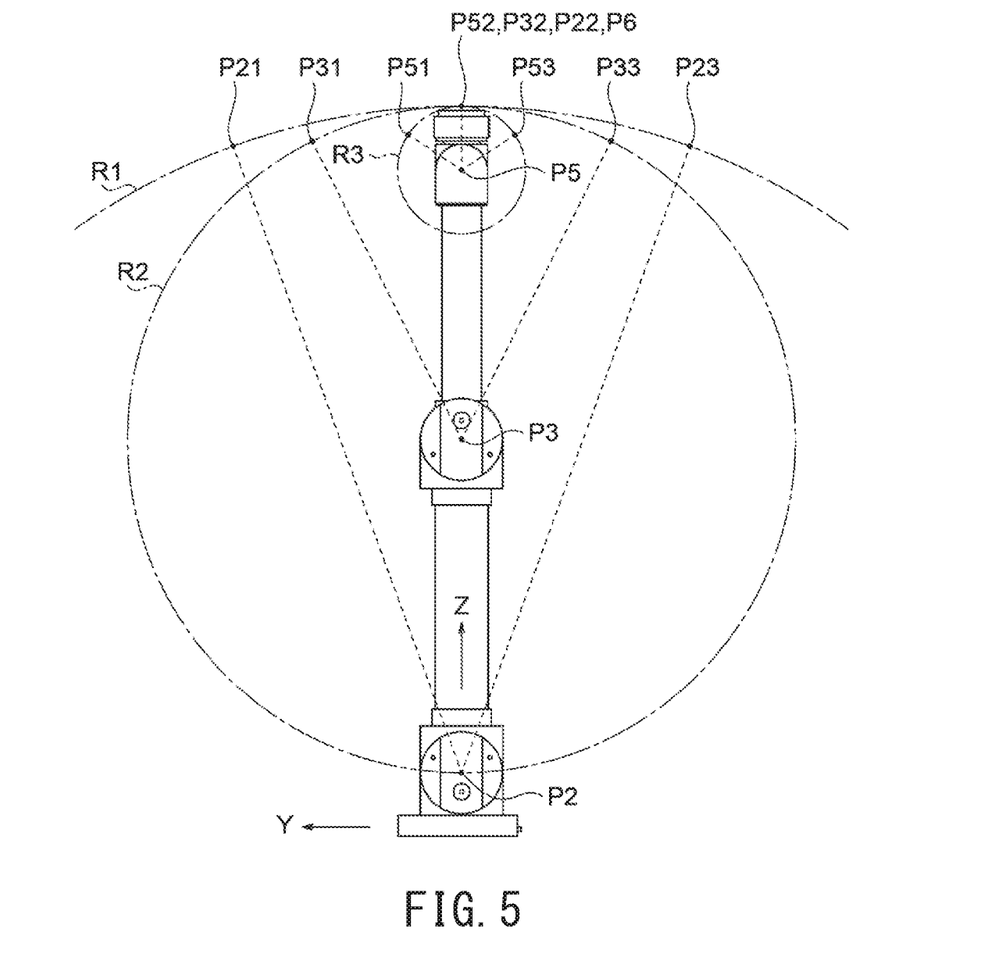
FIG. 5 is a schematic front view for describing a method of adjusting an angle according to an example embodiment of the present disclosure.

FIG. 5 is a schematic front view of the robot 1 immediately after assembly. In FIG. 5, a point P2 is a position of the central axis 10B, a point P3 is a position (axis central position) of the central axis 10C, and a point P5 is a position of the central axis 10E. A left direction in FIG. 5 is a positive direction of a Y axis, and a right direction is a negative direction of the Y axis. In the present embodiment, a laser tracker is used as a position measuring instrument. It is assumed that a mirror which reflects a laser beam emitted from the laser tracker is attached at a position M on an attaching portion 7. The position M is a position of a top portion of the robot and may also be represented by a point P6. Further, FIG. 5 is a view for describing a principle of the method of adjusting the initial posture of the robot 1, and the initial error is expressed as a minimum.

First, in the robot 1 immediately after assembly, the points P3 and P5 are fixed and the first arm 3A is moved in the Y-axis direction around the point P2. In this case, the controller issues a rotation instruction to the motor of the second rotational joint 2B and issues a stop instruction to the motors of other rotational joints (the first rotational joint 2A, the third rotational joint 2C, the fourth rotational joint 2D, the fifth rotational joint 2E, and the sixth rotational joint 2F). The fixation of the points P3 and P5 means that rotation does not occur about the points P3 and P5 when the robot 1 is viewed from the front, as shown in FIG. 5.

On the basis of the instruction from the controller, the first arm 3A is moved by, for example, 20°, in the positive direction of the Y axis and the top portion (the position M or the point P6 in FIG. 2) of the robot stops at a position of a point P21. Since the points P3 and P5 are fixed, the first arm 3A and the second arm 3B are moved together. In this state, the position of the point P21 is measured by the laser tracker. Thereafter, on the basis of the instruction from the controller, the first arm 3A is moved by 40° in the negative direction of the Y axis and the top portion of the robot stops at a point P23 (a position of −20°). In this state, the position of the point P23 is measured by the laser tracker. Then, on the basis of the instruction from the controller, the first arm 3A is returned to ±0° in the Y-axis direction (that is, moved to a position of a point P22), and the top portion of the robot stops at the point P22. The position of the point P22 is measured by the laser tracker. As described above, the positions of the three points P21, P22, and P23 on an arc R1 of which a central point is the point P2 are obtained. When the positions of the points P21, P22, and P23 can be obtained, the position (coordinate values) of the point P2 which is a rotation center may be calculated. The position of the point P2 is calculated by, for example, the laser tracker.

Since the points P3 and P5 are fixed when the position of the point P2 is calculated, the position M or a trajectory of the point P6 always becomes a circle even when there is an initial error at the points P3 and P5. Therefore, the position (coordinate positions in the Z-axis) of the point P2 is calculated without being influenced by initial errors of the points P3 and P5 and becomes a value sufficiently accurate to be compared with an ideal position (design value) of the point P2.

Next, the points P2 and P5 are fixed, and the second arm 3B is moved in the Y-axis direction around the point P3. In this case, the controller issues a rotation instruction to the motor of the third rotational joint 2C and issues a stop instruction to the motor of the other rotational joints. On the basis of the instruction from the controller, the second arm 3B is moved in the positive direction of the Y axis, and the top portion of the robot stops at a position of a point P31. In this state, the position of the point P31 is measured by the laser tracker. Thereafter, the second arm 3B is moved in the negative direction of the Y axis and the top portion of the robot stops at a point P33. In this state, a position of the point P33 is measured by the laser tracker. Then, the second arm 3B is returned to ±0° in the Y-axis direction (that is, the top portion of the robot is moved to a position of a point P32), and the position of the point P32 is measured by the laser tracker. As described above, the positions of the three points P31, P32, and P33 on an arc R2 of which a central point is the point P3 are obtained. When the positions of the points P31, P32, and P33 can be obtained, the position of the point P3 which is a rotation center may be calculated. Further, since the position of the point P32 is identical to the position of the point P22, the position measurement by the laser tracker may be omitted.

Finally, the points P2 and P3 are fixed, and the attaching portion 7 is moved in the Y-axis direction around the point P5. In this case, the controller issues a rotation instruction to the motor of the fifth rotational joint 2E and issues a stop instruction to the motors of the other rotational joints. On the basis of the instruction from the controller, the effector attaching portion 7 is moved in the positive direction of the Y axis and the top portion of the robot stops at a position of a point P51. In this state, the position of the point P51 is measured by the laser tracker. Thereafter, the effector attaching portion 7 is moved in the negative direction of the Y axis and the top portion of the robot stops at a point P53. In this state, a position of the point P53 is measured by the laser tracker. Then, the effector attaching portion 7 is returned to ±0° in the Y-axis direction (that is, the top portion of the robot is moved to a position of a point P52), and the position of the point P52 is measured by the laser tracker. As described above, the positions of the three points P51, P52, and P53 on an arc R3 of which a central point is the point P5 are obtained. When the positions of the points P51, P52, and P53 can be obtained, the position of the point P5 which is a rotation center may be calculated. Further, since the position of the point P52 is identical to the position of the point P22, the position measurement by the laser tracker may be omitted.

Since an inclination angle (deviation from a vertical direction) of a longitudinal center line of the first arm 3A and an inclination angle of a longitudinal center line of the second arm 3B are negligible, the points P2, P3, and P5 are located on one plane. The plane is parallel to a plane defined by the Z axis and the Y axis.

Next, the method of adjusting the initial posture of the robot 1 will be described. When the robot 1 is viewed from the front and when the robot 1 having an initial error shown in FIG. 3 has a posture shown in FIG. 4, calibration performed thereafter may be performed in a short time. Therefore, the fact that the robot 1 has the postures shown in FIGS. 3 and 4 is referred to as adjustment of an initial posture of a robot. It is assumed that ideal positions (design coordinates) of the points P2, P3, and P5 are known in advance.

When angular errors of the rotational joints 2B, 2C, and 2E are represented by dth2, dth3, and dth5, respectively, at the time of assembling the robot 1, the angular errors of the rotational joints 2B, 2C, and 2E are expressed by the following Equations 1 to 5. The angular errors dth2, dth3, and dth5 are angular deviations with respect to the vertical direction when the robot 1 is viewed from the front.

$$dth2 = \arctan\left(\frac{P3x - P2x}{P3z - P2z}\right) \quad \text{(Equation 1)}$$

$$dth3 = \arctan\left(\frac{P5x + d5 \times \sin(dth4) \times \cos(sgm3) - P3x}{P5z + d5 \times \sin(dth4) \times \cos(sgm3) - P3z}\right) \quad \text{(Equation 2)}$$

$$sgm3 = \arctan\left(\frac{P5x - P3x}{P5z - P3z}\right) \quad \text{(Equation 3)}$$

$$dth5 = \arctan\left(\frac{P6x + d5 \times \sin(dth4)\cos(sgm6) - P5x + d5 \times \sin(dth4)\cos(sgm3)}{P6z + d5 \times \sin(dth4)\cos(sgm6) - P5z + d5 \times \sin(dth4)\cos(sgm3)}\right) \quad \text{(Equation 4)}$$

$$sgm6 = \arctan\left(\frac{P6x - P5x}{P6z - P5z}\right) \quad \text{(Equation 5)}$$

Further, in Equations 1 to 5, P3z denotes a Z-axis coordinate position of the point P3, P2z denotes a Z-axis coordinate position of the point P2, P3x denotes an X-axis coordinate position of the point P3, and P2x denotes an X-axis coordinate position of the point P2. P6z denotes a Z-axis coordinate position of the point P6, P6x denotes an X-axis coordinate position of the point P6, P5z denotes a Z-axis coordinate position of the point P5, and P5x denotes an X-axis coordinate position of the point P5. Further, dth4 denotes the angular error of the rotational joint 2D and may be calculated as an angle between a plane (a plane including the arc R3) defined by the points P51, P52, and P53 and a plane (a plane including the arc R2) defined by the points P31, P32, and P33. In order to obtain a value of the angular error dth4, it is only necessary to obtain an angle between normal vectors of these two planes. The angular errors dth2 to dth5 are calculated by, for example, the laser tracker. The angular errors dth2 to dth5 are angle adjustment amounts for eliminating the initial error of the robot 1. sgm3 denotes an angle of inclination of a direction vector from the point P5 to the point P3, and sgm6 denotes an angle of inclination of a direction vector from the point P5 to the point P6. d5 denotes a design value of a length of a line connecting the fifth rotational joint 2E and the sixth rotational joint 2F. The design value d5 denotes a distance from an intersection of the central axis 10D and the central axis 10E to the point P5 in FIG. 2. An actual value of the design value d5 of the robot including the initial error is different from the design value. However, since a difference between the measured value and the design value d5 is infinitely small, the design value is used in the present embodiment. Further, the actual value including the initial error may be used for the design value d5.

Further, the angular errors of the first rotational joint 2A and the sixth rotational joint 2F are irrelevant when the robot 1 is set in the same posture as that of FIG. 4 and thus are not considered in the present embodiment.

After the angular errors dth2 to dth5 are calculated, for example, the laser tracker converts the angular errors dth2 to dth5 into electrical signals (pulses) and transmits the pulses to the controller. On the basis of the received pulses, the controller transmits a rotation instruction to the motors of the rotational joints 2B to 2E. When the motors of the rotational joints 2B to 2E are rotated based on the rotation instruction, the angular errors (the initial errors) of the rotational joints 2B to 2E are eliminated.

When the initial errors are eliminated, the first arm 3A and the second arm 3B extend vertically from the mounting surface, as shown in FIG. 4, and the angle (when viewed from the front) between the first arm 3A and the second arm 3B becomes about 180°.

According to the present embodiment, it is possible to determine the angular errors dth2 to dth5 by Equations 1 to 5. Therefore, the angle adjustment amount for adjusting the initial posture of the 6-axis robot may be determined by a simple method.

In the above-described present embodiment, the positions of the three points P21, P22, and P23 on the arc are measured and obtained when the positions of the points P2, P3, and P5 are calculated. However, the present embodiment is not limited to the measurement. For example, the positions of the five points on the arc of which a central point is the point P2 may be measured, and the position of the point P2 may be calculated based on the positions of the five points.

Further, although the laser tracker is used as the position measuring instrument, another position measuring instrument may be used.

In the above-described embodiment, although the posture (the initial posture) of the robot immediately after the robot is assembled is described as being an upright posture as shown in FIG. 3 (or FIG. 4), a posture other than the upright posture may be the initial posture.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of adjusting a posture of a 6-axis robot standing in a direction perpendicular or substantially perpendicular to a robot mounting surface, the method comprising:
   specifying axis central positions of three axes located at different heights in the direction perpendicular or substantially perpendicular to the robot mounting surface of the 6-axis robot by sequentially rotating the 6-axis robot about each of the three axes in order up from the robot mounting surface;
   specifying two planes including two arcs of which rotation centers are represented by two axes farther away from the robot mounting surface among the three axes;
   specifying a position of a predetermined point on the arc farther away from the robot mounting surface among the two arcs; and
   determining an angle adjustment amount of the three axes in a rotation direction and an angle adjustment amount of an axis extending between the two axes in a rotation direction based on the specified axis central positions of the three axes, the specified two planes, and the specified position of the predetermined point.

2. The method of claim 1, wherein the determining of the angle adjustment amount is performed before calibration is performed on the 6-axis robot.

3. The method of claim 1, wherein the 6-axis robot includes a first rotational joint, a second rotational joint, a third rotational joint, a fourth rotational joint, a fifth rotational joint, and a sixth rotational joint in order from the robot mounting surface, and the three axes include:
   a rotation axis of the second rotational joint;
   a rotation axis of the third rotational joint; and
   a rotation axis of the fifth rotational joint.

4. The method of claim 3, wherein the angle adjustment amount is an amount that makes an angle difference between the perpendicular or substantially perpendicular direction and a first arm extending from the second rotational joint to the third rotational joint zero.

5. The method of claim 3, wherein the angle adjustment amount is an amount that makes an angle difference between the perpendicular or substantially perpendicular direction and a second arm extending from the fourth rotational joint to the fifth rotational joint zero.

6. The method of claim 3, wherein the specifying of the axis central position of the rotation axis of the second rotational joint includes calculating an axis central position of the rotation axis of the second rotational joint from at least three points on an arc represented by a front end of the 6-axis robot about a current axis central position of the rotation axis of the second rotational joint while the third rotational joint and the fifth rotational joint are fixed.

7. The method of claim 6, further comprising obtaining the at least three points on the arc using a laser tracker.

8. The method of claim 3, wherein the specifying of the axis central position of the rotation axis of the third rotational joint includes calculating an axis central position of the rotation axis of the third rotational joint from at least three points on an arc represented by a front end of the 6-axis robot about a current axis central position of the rotation axis of the third rotational joint while the second rotational joint and the fifth rotational joint are fixed.

9. The method of claim 3, wherein the specifying of the axis central position of the rotation axis of the fifth rotational joint includes calculating an axis central position of the rotation axis of the fifth rotational joint from at least three points on an arc represented by a front end of the 6-axis robot about a current axis central position of the rotation axis of the fifth rotational joint while the second rotational joint and the third rotational joint are fixed.

10. The method of claim 1, wherein the 6-axis robot is driven to adjust an initial posture by using the angle adjustment amount of the three axes in the rotation direction and the angle adjustment amount of the axis extending between the two axes in the rotation direction.

11. An apparatus for adjusting a posture of a 6-axis robot standing in a direction perpendicular or substantially perpendicular to a robot mounting surface, the apparatus comprising:
   a controller to transmit a rotation instruction to motors of rotational joints of the 6-axis robot; and
   a position detector to measure a top portion of the 6-axis robot and to transmit an electrical signal to the controller; wherein
   the position detector specifies axis central positions of three axes located at different heights in a perpendicular or substantially perpendicular direction of the 6-axis robot after the controller sequentially rotates the 6-axis robot about each of the three axes in order up from the robot mounting surface;
   the position detector specifies two planes including two arcs of which rotation centers are represented by two axes farther away from the robot mounting surface among the three axes;
   the position detector specifies a position of a predetermined point on the arc farther away from the robot mounting surface among the two arcs; and
   the position detector determins an angle adjustment amount of the three axes in a rotation direction and an angle adjustment amount of an axis extending between the two axes in a rotation direction based on the specified axis central positions of the three axes, the specified two planes, and the specified position of the predetermined point.

12. The apparatus according to claim 11, wherein the position detector includes a laser tracker.

* * * * *